United States Patent
Lysdal et al.

(10) Patent No.: US 11,487,498 B2
(45) Date of Patent: Nov. 1, 2022

(54) VOLUME CONTROL FOR AUDIO AND VIDEO CONFERENCING APPLICATIONS

(71) Applicant: NVIDIA Corporation, Santa Clara, CA (US)

(72) Inventors: Henning Lysdal, Roskilde (DK); Ruthie Lyle, Durham, NC (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/153,466

(22) Filed: Jan. 20, 2021

(65) Prior Publication Data

US 2022/0229626 A1  Jul. 21, 2022

(51) Int. Cl.
*G06F 3/16* (2006.01)
*H04L 12/18* (2006.01)

(52) U.S. Cl.
CPC .......... *G06F 3/165* (2013.01); *H04L 12/1822* (2013.01)

(58) Field of Classification Search
None
See application file for complete search history.

(56) References Cited

U.S. PATENT DOCUMENTS

| | | | |
|---|---|---|---|
| 7,006,616 B1* | 2/2006 | Christofferson | H04L 65/4038 379/202.01 |
| 8,190,438 B1* | 5/2012 | Nelissen | H04S 7/30 704/274 |
| 2021/0368135 A1* | 11/2021 | McElroy | H04N 7/147 |
| 2021/0377062 A1* | 12/2021 | Stevens | H04M 3/569 |

OTHER PUBLICATIONS

"Gather" Gather Presence Inc. Retrieved from the Internet on Dec. 2, 2020 from URL <https://gather.town/>.

* cited by examiner

Primary Examiner — Hemant S Patel
(74) Attorney, Agent, or Firm — Taylor English Duma LLP

(57) ABSTRACT

In various examples, when a local user initiates an instance of a video conference application, the user may be provided with a user interface (UI) that displays an icon corresponding to the user as well as several other icons corresponding to participants in the instance of the video conference application. As the users converse, the local user may find that a particular participant is speaking loudly compared to the other remote users. The local user may then select an icon corresponding to the particular participant and move the icon away from the local user's icon in the UI. Based on moving the remote user's icon away from the local user's icon, the system may reduce the output volume of the audio data for the participant. Further, if the local user moves the participant icon closer to the local user's icon, the volume for the participant may be increased.

27 Claims, 9 Drawing Sheets

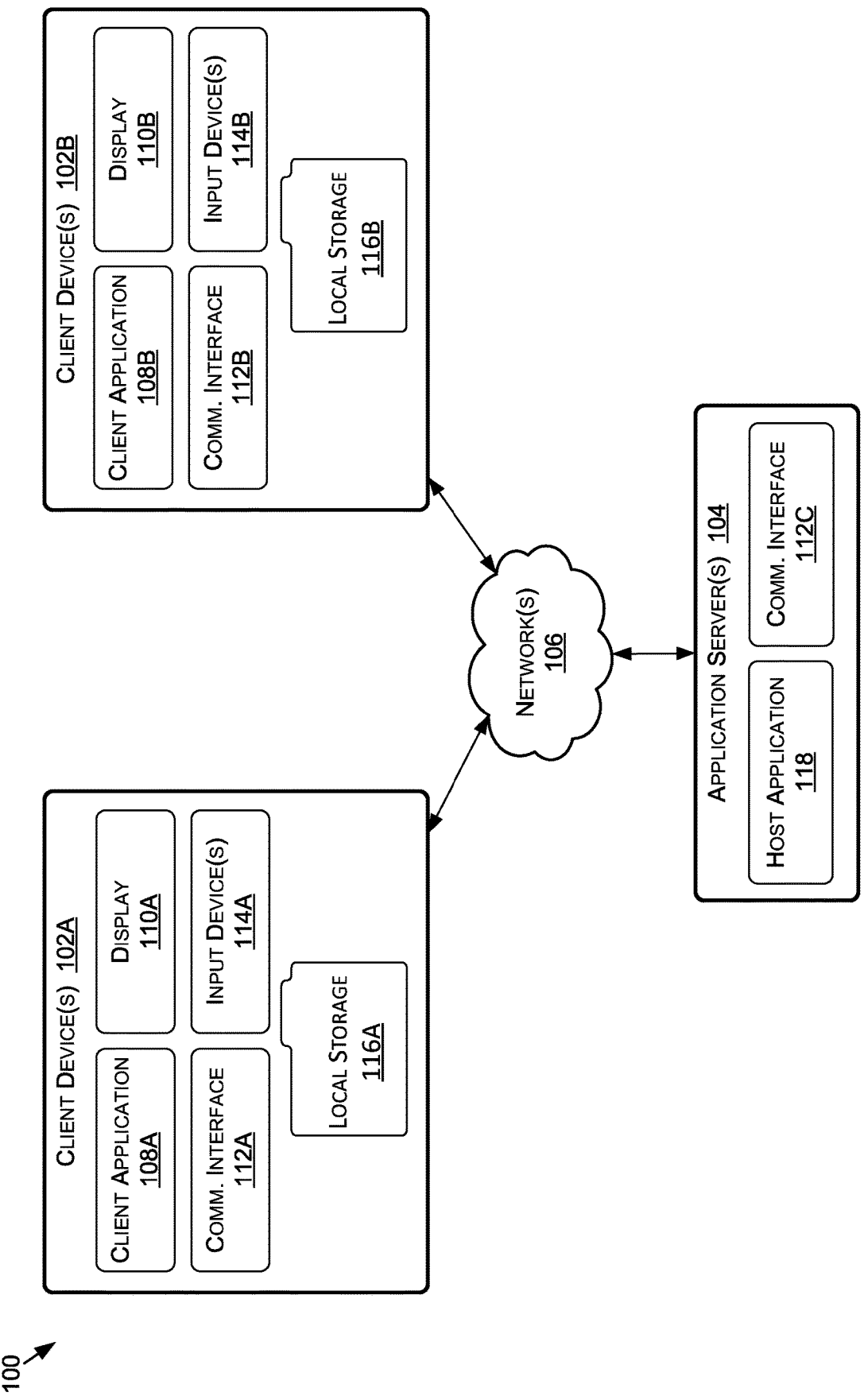

VOLUME CONTROL FOR AUDIO AND VIDEO CONFERENCING APPLICATIONS

BACKGROUND

Users of multi-party applications—such as online video conferences, game streaming services, video streaming services, etc.—often find it difficult to focus their attention on one speaker or participant when multiple participants are talking at the same time, or when different participants speak at different volume levels. For example, two participants may be speaking at the same time, but one might speak very loudly compared to a quieter participant. In that event, a user receiving the audio stream may have difficulty hearing and/or understanding the quieter participant, especially if both participants are speaking simultaneously. While the user can raise or lower the output volume for all participants in the stream, the volume for each individual participant in the stream is determined by factors outside of the control of the user—such as how loudly participants speak and/or where the other participants place their microphones relative to themselves. As a result, the receiving user must attempt to decipher crosstalk, ask quieter participants to speak more loudly or louder participants to speak more quietly, and/or try to control the order in which participants speak so that there is less crosstalk. However, these options may be uncomfortable for a user, or may be unavailable, such as where the user is a participant without access to microphone functionality or other communication means for conveying their experience with volume levels of other participants.

SUMMARY

Embodiments of the present disclosure relate to position based volume control for audio and video conferencing. Systems and methods are disclosed that apply updated audio settings to an application participant based on manipulations to a participant icon. For example, and in contrast to conventional systems, such as those described above, systems and methods of the present disclosure automatically modify a volume output for audio data corresponding to a remote participant (e.g., other users within the instance of the application) when a local user moves (e.g., towards or away from an icon associated with the local user) or otherwise manipulates (e.g., shrinks to decrease volume, expands to increase volume) an icon (e.g., thumbnail, tile, video feed, picture, avatar, graphical image, or other representation) associated with the remote participant.

As a non-limiting example, when a local user initiates an instance of a video conference application, the user may be provided with a user interface (UI) that displays an icon (or other representation or indicator) corresponding to the user as well as one or more other icons corresponding to participants in the instance of the video conference application. However, as the users converse, the local user may find that a particular participant is speaking very loudly compared to the other participants. The local user may then select an icon corresponding to the particular participant and move the icon farther away from the local user's icon in the UI. Based on moving the particular participant's icon away from the local user's icon, the system may identify a subset of audio data (e.g., from within a stream of audio data) corresponding to the particular participant and reduce the output volume of the audio data for the participant. Further, or alternatively, if the local user moves the participant's icon closer to the local user's icon, the volume of the audio data for the participant may be increased. Advantageously, the local user may regulate the output volume corresponding to each remote user by positioning (or otherwise manipulating) each remote user's icon relative to the local user's icon—thereby enabling the local user to more clearly understand and track the conversations within the video conference application.

BRIEF DESCRIPTION OF THE DRAWINGS

The present systems and methods for position based volume control for audio and video conferencing are described in detail below with reference to the attached drawing figures, wherein:

FIG. 1 is an example audio manipulation system, suitable for use in implementing some embodiments of the present disclosure;

DETAILED DESCRIPTION

Figure 2A:
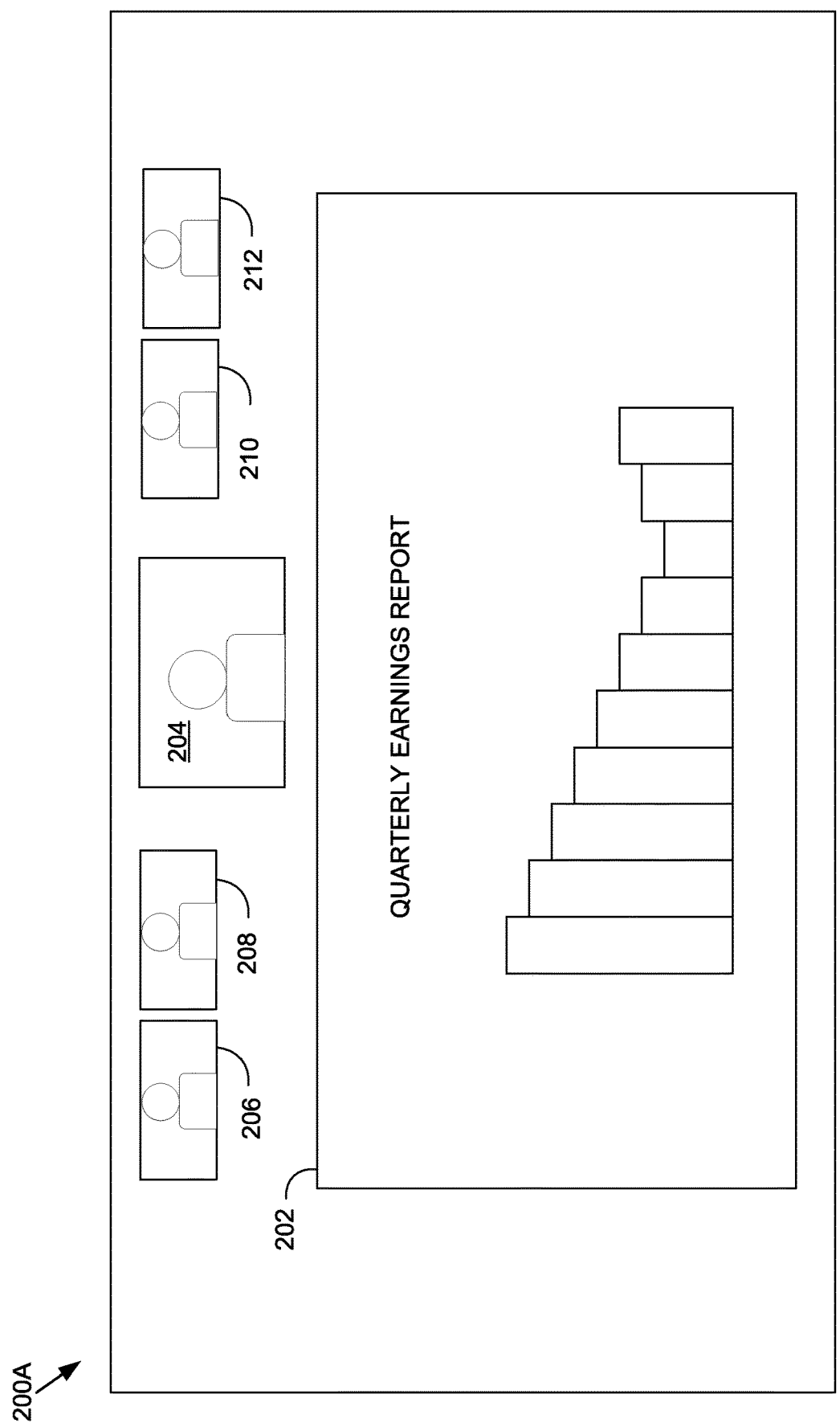
FIGS. 2A-2C illustrate example user interfaces (UIs) for manipulating user icons, suitable for use in implementing some embodiments of the present disclosure.

Systems and methods are disclosed related to position based volume control for audio and video conferencing. Although primarily described herein with respect to video conference implementations, this is not intended to be limiting, and the systems and methods of the present disclosure may be implemented in any implementation for updating audio settings based on manipulations to an icon. For non-limiting examples, the systems and methods described herein may be implemented for video streaming applications, game streaming applications, virtual learning applications, social media content sharing applications, video sharing applications, and/or other application types where volume adjustments to one or more participants may be made.

In some embodiments, when a local user initiates an instance of a video conference application, the user may be provided with a user interface (UI) that displays an icon (or other representation or indicator) corresponding to the user as well as several other icons (or other representations or indicators) corresponding to participants in the instance of the video conference application. Initially, a volume level may be set for each remote user—such as a default level set by the application or based on a learned or user-configured volume level corresponding to specific participants. Additionally or alternatively, the local user may manually select or pre-specify a default volume level for specific participants (e.g., by selecting a user icon and setting a volume level for a specific user prior to initializing the video conference). However, as the users converse, the local user may find that a particular participant is speaking very loudly or very quietly compared to the other participants, with the inconsistency leading to either difficulty in hearing or discomfort when the same general volume levels are applied to all participants. The local user may then select an icon corresponding to the particular participant and modify a volume output for audio data corresponding (e.g., specific) to the particular participant by moving or otherwise manipulating (e.g., shrink icon size to decrease volume, expand icon size to increase volume) the icon. For example, the local user may move a louder participant's icon away from the local user's icon in the UI. Based on moving the louder participant's icon away from the local user's icon, the system may determine an updated volume level (e.g., reduce volume) for the louder participant's icon. Subsequently, the system may identify a subset of audio data (e.g., from within one or more streams of audio data) corresponding to the louder participant and reduce the output volume of the audio data for the louder participant. Further, if the local user moves a participant's icon closer to the local user's icon, the volume of the audio data output for the participant may be automatically increased. In one or more embodiments, the local user may position or reposition an icon or other representation of one or more participants to a (pre-)designated area within the user interface associated with a particular effect. For example, a local user may reposition one or more participant icons to an area designated to amplify a volume level of audio data corresponding to the participants with representations positioned in the area. Similarly, the local user may reposition one or more participant icons to an area designated to reduce (or mute) a volume level of audio data corresponding to participants with representations positioned in the area. Advantageously, the local user may regulate the output volume corresponding to each participant (including several at the same time) by positioning each participant's icon relative to the local user's icon—thereby increasing the user experience for the local user by allowing for dynamic adjustment to audio settings (e.g., volume, treble, bass, noise cancellation, etc.) on a per-participant basis.

In other embodiments, a user may adjust a volume level for audio data corresponding to a participant by manipulating the size of the participant icon corresponding to the participant. For example, in an application on a touchscreen mobile device (e.g., smart phone, tablet, etc.)—where the screen size may be less suitable for distance-based icon manipulation—the user may perform a pinch-to-zoom in/out gesture on the participant icon, thereby increasing or decreasing the size of a participant icon depending on whether the gesture is a pinch-to-zoom in gesture (e.g., selecting an icon using two fingers and spreading the fingers outwards) or a pinch-to-zoom out gesture (e.g., selecting an icon using two fingers and moving the fingers towards one another). Accordingly, a volume level may be associated with the relative size of the participant icon. For example, as the user increases the size of participant icon, a volume level for the audio data associated with the participant may increase and as the user decreases the size of the participant icon, the volume level for the audio data may decrease, or vice versa. Similarly, icon size may be used to increase/decrease a volume level in desktop applications. However, where a touchscreen is unavailable, the user may select a corner or side of a participant's icon and manipulate the corner or side to adjust the size or dimensions of the participant's icon.

In some embodiments, a configuration of participant icons on a user's first device may be dynamically ported to a user's second device. For example, a user may configure one or more participant icons while participating in an instance of an application session on the user's personal computer (PC) and initiate a new instance of the application session on the user's mobile device (e.g., using common login information for the two instances of the application session). Upon initiating the new instance of the application session on the user's mobile device, the system may access the configuration, and/or volume levels, of the one or more participant icons from the instance of the application session on the user's PC and adjust the one or more participant icons on the mobile device to match the volume levels for each corresponding participant. Volume levels may be used to recreate a configuration at a new user interface for the application session. For example, the volume levels corresponding to each participant may be used to adjust the size of the participant icons on the mobile device.

In some embodiments, a volume level may be adjusted across applications based on an in-application distance/position. For example, two or more player avatars may be linked (e.g., via an API, plug-in, etc.) to one another in a virtual environment—such as in a video game. The distance/position of one or more participant avatars relative to a user avatar within the virtual environment may be used to adjust a volume level, including a spatial volume level (e.g., left, right, front, back, up, down, etc.), of the participant avatar. Output volume settings may be calibrated to mimic a real-world environment. For example, based on a participant avatar being a distance away from, and oriented respective of, the user avatar's position, the system may adjust the volume level corresponding to the participant avatar output to the user (e.g., via the user's stereo headphones, stereo speakers, surround-sound speakers, speaker arrays, etc.). As the distance and/or position changes during an application session, the system may adjust the volume level accordingly. By adjusting the volume level based on a relative position of the user avatar and the one or more participant avatars, the user may more quickly and easily locate the one or more participant avatars in the virtual environment.

In some embodiments, each user participating in an application session may form a different configuration of icons on their local device. For example, a first user may move a second user's icon very close to the first user's icon on the first user's device, while the second user may move the first user's icon far away from the second user's icon on the second user's device. As such, the second user's volume level will be increased on the first user's device and the first user's volume level will be decreased on the second user's device. In some embodiments, each user may be provided with real-time feedback regarding how their icon is being configured (e.g., moved away or near) on the other user's devices. For example, a user whose icon has been moved away from another user's icon, such that the user's volume level has been reduced (e.g., below a threshold), may be provided with an indicator—such as a list of users who cannot or likely cannot hear the user—to inform the user that the other user(s) can no longer hear the user. This information may be useful to notify the user of how they are being perceived (e.g., speaking too loudly/quietly or engaging in cross talk) in the application session. In some embodiments, users may select (e.g., opt in/out) whether they would like to provide information regarding user icon movements/configurations to users participating in the application session.

In some embodiments, such as where a first user has reduced a second user's volume level below a threshold and the first user can no longer hear the second user, the second user may be able to reengage the first user in a number of ways. For example, the second user may provide nonverbal feedback to the first user in the form of a hand raise, a message, a pop-up indicator, and/or other means of nonverbal communication. Further, in some embodiments, the system may employ a natural language processor (NLP) that can determine when a user's name is spoken. Following the above example, based on determining that the second user has spoken the first user's name, the system may increase the volume level of the second user such that the first user can hear the second user, enabling the second user to reengage the first user.

In further embodiments, the system may gather and record data from any number of application sessions of the application to be processed by one or more machine learning models, one or more deep neural networks (DNNs), and/or one or more other algorithm types, either locally or at a remote server, to determine typical user behaviors. For example, attenuation data, a list of users, time of day, meeting topic, and/or other contextual data may be used to generate typical user behavior predictions for a given context. These predictions may be used to perform automated attenuation operations for a user. For example, if a user typically manipulates or otherwise causes a user icon associated with a soft spoken user to be closer to the user's icon during a weekly budget meeting but manipulates or otherwise causes the soft spoken user's icon away from the user's icon during a monthly virtual happy hour, the system may learn this behavior and automatically adjust the soft spoken user's icon location in future budget meetings and virtual happy hours.

With reference to FIG. 1, FIG. 1 is an example audio manipulation system 100 (alternatively referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the system 100 may include similar components, features, and/or functionality to those of example content streaming system 500 of FIG. 5, example computing device 600 of FIG. 6, and/or example data center 700 of FIG. 7.

The audio manipulation system 100 may include, among other things, client devices 102A and 102B (referred to collectively herein as "client devices 102") and an application server 104. Although the client devices 102A and 102B are illustrated in FIG. 1, this is not intended to be limiting. In any example, there may be any number (e.g., one or more) of client devices 102. Components of the audio manipulation system 100 may communicate over network(s) 106. The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, Ultra-Wideband (UWB), etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the audio manipulation system 100 may communicate with one or more of the other components via one or more of the network(s) 106.

The client devices 102 may include a smart phone, a laptop computer, a tablet computer, a desktop computer, a wearable device, a game console, a virtual/augmented/mixed reality system (e.g., a headset, a computer, a game console, remote(s), controller(s), and/or other components), a streaming device (e.g., an NVIDIA SHIELD), a smart-home device that may include an intelligent personal assistant, another type of device capable of supporting video conferencing or other applications types (e.g., gameplay, video chat, customer service chat, etc.), and/or a combination thereof.

The client devices 102A/102B may include a client application 108A/108B, a display 110A/110B, a communication interface 112A/112B, an input device(s) 114A/114B, and/or local storage 116A/116B. Although only a few components and/or features of the client devices 102 are illustrated in FIG. 1, this is not intended to be limiting. For example, the client devices 102 may include additional or alternative components, such as those described below with respect to FIGS. 6 and/or 7.

The client application 108A and 108B (referred to collectively herein as "client applications 108") may include a mobile application, a computer application, a console application, and/or another type of application. The client applications 108 may include instructions that, when executed by a processor(s), cause the processor(s) to, without limitation, receive input data representative of user inputs to the one or more input device(s) 114, transmit the input data to the application server(s) 104, retrieve application data from memory or local storage 116, receive the application data using the communication interfaces 112 from the application server(s) 104, and cause display of the application on the display 110. For example, the client application 108 may operate as a facilitator for enabling streaming of a video conferencing session associated with the client application on the client devices 102. The client application 108 may also include instructions that, when executed by a processor(s), cause the processor(s) to transmit data to, and receive data from, the application server(s) 104. For example, the client application 108A may transmit to the application server(s) 104 real-time feedback regarding icon manipulations performed on the client application 108A, and receive from the application servers(s) 104 real-time feedback regarding icon manipulations performed on the client application 108B. In other examples, the client application 108A may transmit to the application server(s) 104 session data (e.g., attenuation data, a list of users, time of day, meeting topic, and/or other contextual data) from any number of application sessions. In such examples, the host application 118 may generate (e.g., by a machine learning model, a deep neural network (DNN), or another algorithm type) typical user behavior predictions for a given context.

The displays 110A and 110B (referred to collectively herein as "displays 110") may include any type of display capable of displaying the application (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the displays 110 may include more than one display (e.g., a dual-monitor display for a computer). In some examples, the display is a touch-screen display, such as a touch-screen of a smart phone, tablet computer, laptop computer, or the like, where the touch-screen is at least one of the input device(s) 114 of the client devices 102.

The input device(s) 114A and 114B (referred to collectively herein as "input device(s) 114") may include any type of devices that are capable of providing user inputs to the application. The input device(s) may include a keyboard, a mouse, a microphone(s), a touch-screen display, a controller(s), a remote(s), a headset (e.g., sensors of a virtual/augmented/mixed reality headset), and/or other types of input devices.

The communication interface 112A, 112B, 112C (referred to collectively herein as "communication interfaces 112") may include one or more components and features for communicating across one or more networks, such as the network(s) 106. The communication interfaces 112 may be configured to communicate via any number of network(s) 106, described herein. For example, to communicate in the audio manipulation system 100 of FIG. 1, the client devices 102 may use an Ethernet or Wi-Fi connection through a router to access the Internet in order to communicate with the application server(s) 104 and/or with other client devices 102.

The local storage 116A and 116B (referred to collectively herein as "local storage 116") may include any of a variety of computer-readable media. The computer-readable media may be any available media that can be accessed by the client devices 102. The computer-readable media may include both volatile and nonvolatile media, and removable and non-removable media. By way of example, and not limitation, the computer-readable media may comprise computer-storage media and communication media. The local storage 116 may include additional or alternative components, such as those described herein with respect to the memory 604 of FIG. 6. In accordance with some embodiments of the present disclosure, portions of the client application 108 may be stored in the local storage 116. In some embodiments, application session data—such as attenuation data, a list of users, time of day, meeting topic, and/or other contextual data—may be stored in the local storage 116.

The application server(s) 104 may include host application 118 and communication interface 112C. The host application 118 may correspond to the client applications 108. However, rather than performing audio manipulation operations (e.g., modify a volume output for audio data corresponding to a remote participant) locally on client devices 102, the host application 118 may perform the audio manipulation operations described herein on the application servers 104 and communicate modified audio data to the client devices 102. As described above, the communications interface 112C may include one or more components and features for communicating across one or more networks. Although only a few components and/or features of the application server(s) 104 are illustrated in FIG. 1, this is not intended to be limiting. For example, the application server(s) 104 may include additional or alternative components, such as those described below with respect to the example content streaming system 500 of FIG. 5, the example computing device 600 of FIG. 6, and/or the example data center 700 of FIG. 7.

In operation, when client devices 102 initiate an instance of a video conference application as part of a video conference session via the client application 108, the client devices 102 may each be provided with a graphical UI that displays icons corresponding to each user participating in the instance of the video conference application. The icons may include, without limitation, a thumbnail, a tile, a video feed (e.g., a window with live video, such as that captured from a camera of the particular user), a still image picture, a virtual background, an avatar, graphical image, or other representation. Initially, a volume level may be set for user—such as a default level set by the client application 108 or based on a learned volume level or user-configured volume level corresponding to specific users. For example, client device 102A may be operated by a local user and a plurality of client devices 102B may each be operated by a plurality of remote users. In such example, as the users converse, the local user may find that a particular remote user or participant is speaking very loudly compared to the other remote users. The client device 102A may then receive, from the local user, an icon selection corresponding to the particular remote user as well as a manipulation of the icon corresponding to the particular remote user via the input devices 114A. For example, the local user may manipulate or otherwise cause the particular remote user icon to be moved farther away from the local user's icon as visually (e.g., graphically) presented in the UI. Based on the particular remote user's icon being moved farther away from the local user's icon as visually presented in the UI, the client application 108A may identify at least a subset of audio data received from a client device 102B associated with the particular remote user and reduce the volume output by the client device 102A for at least the subset of audio data.

Figure 2B:
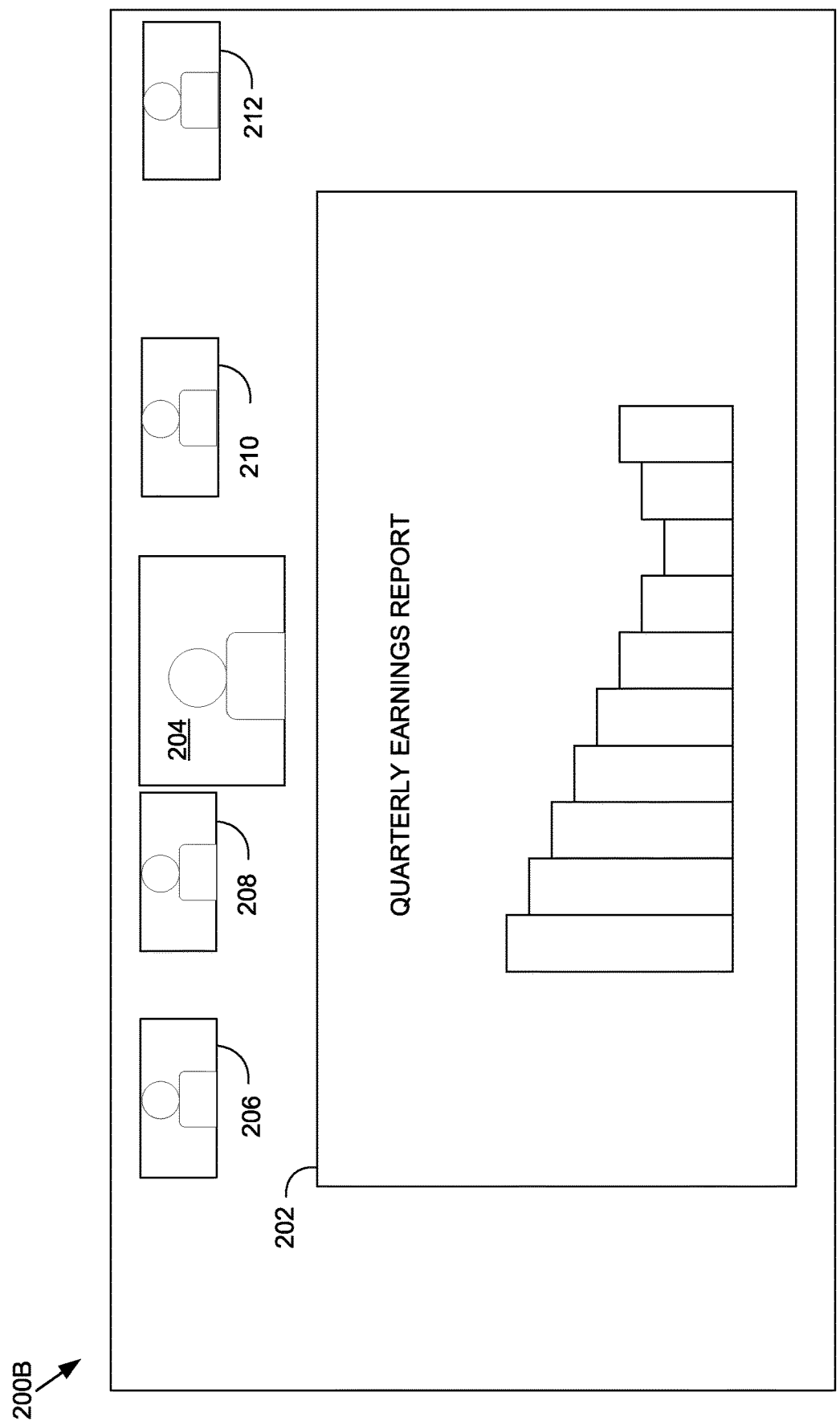
Figure 2C:
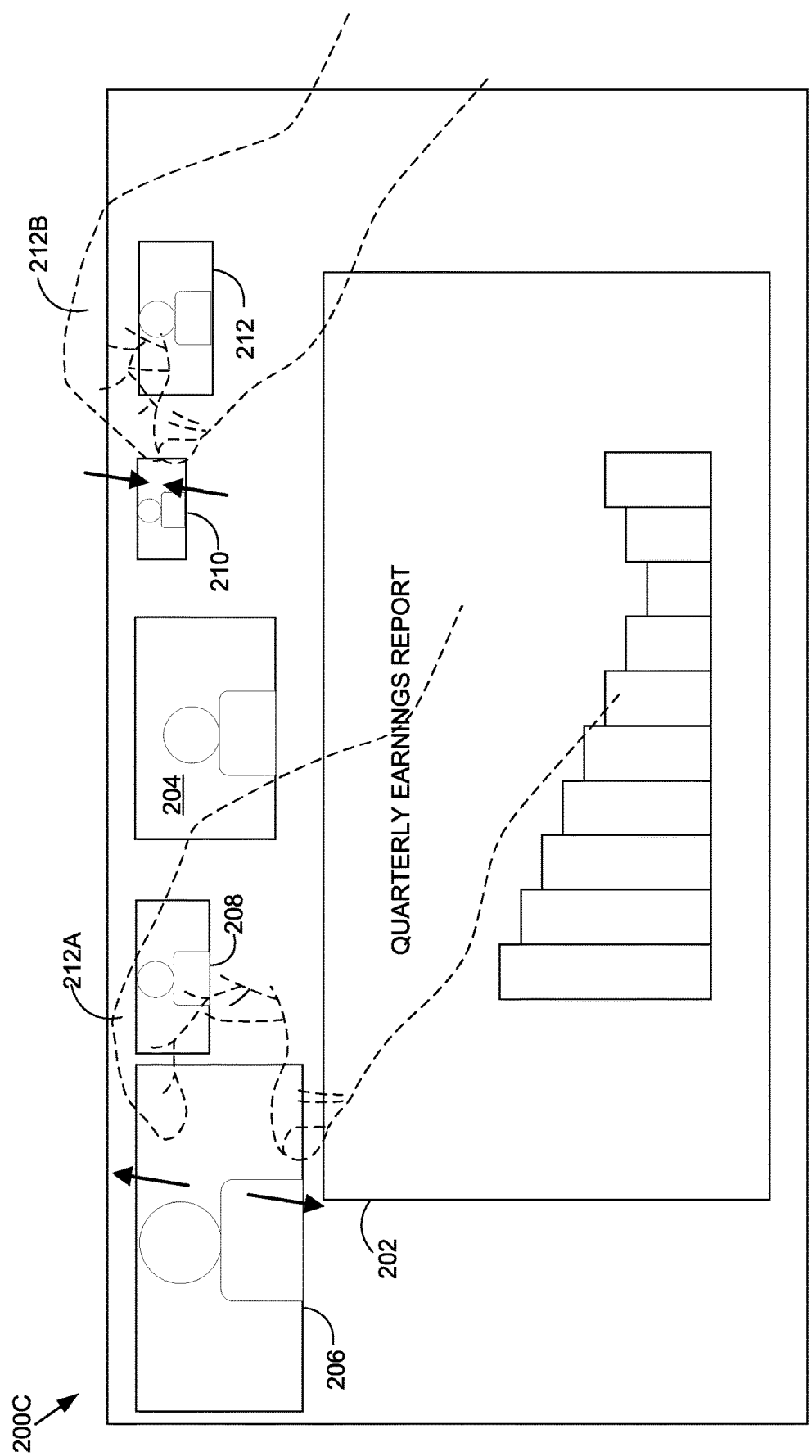

As an example, and with reference to FIGS. 2A-2C, FIGS. 2A-2C illustrate example UIs for manipulating user icons, suitable for use in implementing at least some embodiments of the present disclosure. FIG. 2A includes application UI 200A, presentation 202, user icon 204, and participant icons 206, 208, 210, and 212. In operation, a user associated with user icon 204 and users associated with each of the participant icons 206, 208, 210, and 212 may participate in an application session. Application UI 200A may correspond to an instance of the application—such as an online video conference, game streaming service, video streaming service, etc.—from a perspective of a local user associated with user icon 204. Initially, the user associated with user icon 204 may set a volume level for each of the users associated with each of the participant icons 206, 208, 210, and 212. Additionally or alternatively, a default level may be set for the application session by the application or based on a learned volume level corresponding to specific participants.

In some embodiments, an output audio level for a participant icons 206, 208, 210, and 212 may be inversely related to a distance between the user icon 204 and the participant icons 206, 208, 210, and 212. For example, turning to FIG. 2B, as the users converse, the user associated with user icon 204 may find that one or more users associated with participant icons 206, 208, 210, and/or 212 is/are speaking very loudly/softly compared to the other users. To more comfortably hear and understand the users participating in the application session, the user associated with user icon 204 may then select the participant icon 208 and move the participant icon 208 closer to user icon 204, thereby increasing the output volume for the user associated with participant icon 208. Likewise, the user associated with user icon 204 may select the participant icon 212 and move the participant icon 212 away from user icon 204, thereby decreasing the output volume for the user associated with participant icon 212. However, the change in volume or other audio settings may have a different relationship, such that moving closer may decrease volume while moving farther away may increase volume, depending on the embodiment and/or the particular user's settings.

In some embodiments, an output audio level for a participant icons 206, 208, 210, and 212 may be directly related to a size of the participant icons 206, 208, 210, and 212. For example, turning to FIG. 2C, as the users converse, the user associated with user icon 204 may find that one or more users associated with participant icons 206, 208, 210, and/or 212 is/are speaking very loudly/softly compared to the other users. The user associated with user icon 204 may then select the participant icon 206 and enlarge (or cause enlargement of) the participant icon 206 using a "pinch-to-zoom" in gesture 212A (e.g., selecting the icon 206 using two fingers and spreading the fingers outwards), thereby increasing the size of the participant icon 206 as well as the output volume for the user associated with participant icon 206. Likewise, the user associated with user icon 204 may select the participant icon 210 and shrink (or cause shrinkage of) the participant icon 210 using a "pinch-to-zoom" out gesture 212B (e.g., selecting the icon 210 using two fingers and closing the fingers towards one another), thereby decreasing the size of the participant icon 210 as well as the output volume for the user associated with participant icon 210. In some embodiments, the output volume may be determined by comparing the size of the participant icons 206, 208, 210, and 212 to a default size (e.g., initial size at the start of an application session). In other embodiments, the output volume may be determined by comparing the size of each of the participant icons 206, 208, 210, and/or 212 to each of the other participant icons 206, 208, 210, and/or 212. For example, the participant icon 206, being the largest, may have an output volume of 100% and the participant icons 208 and 212, being roughly 25% the size of the participant icon 206, may have an output volume of 25%. However, if the size of the participant icon 206 is reduced to match the size of participant icons 208 and 212, each of participant icons 206, 208, and 212 may have an output volume of 100% because each of participant icons 206, 208, and 212 would now each be the largest participant icons in the application UI 200C.

Figure 3:
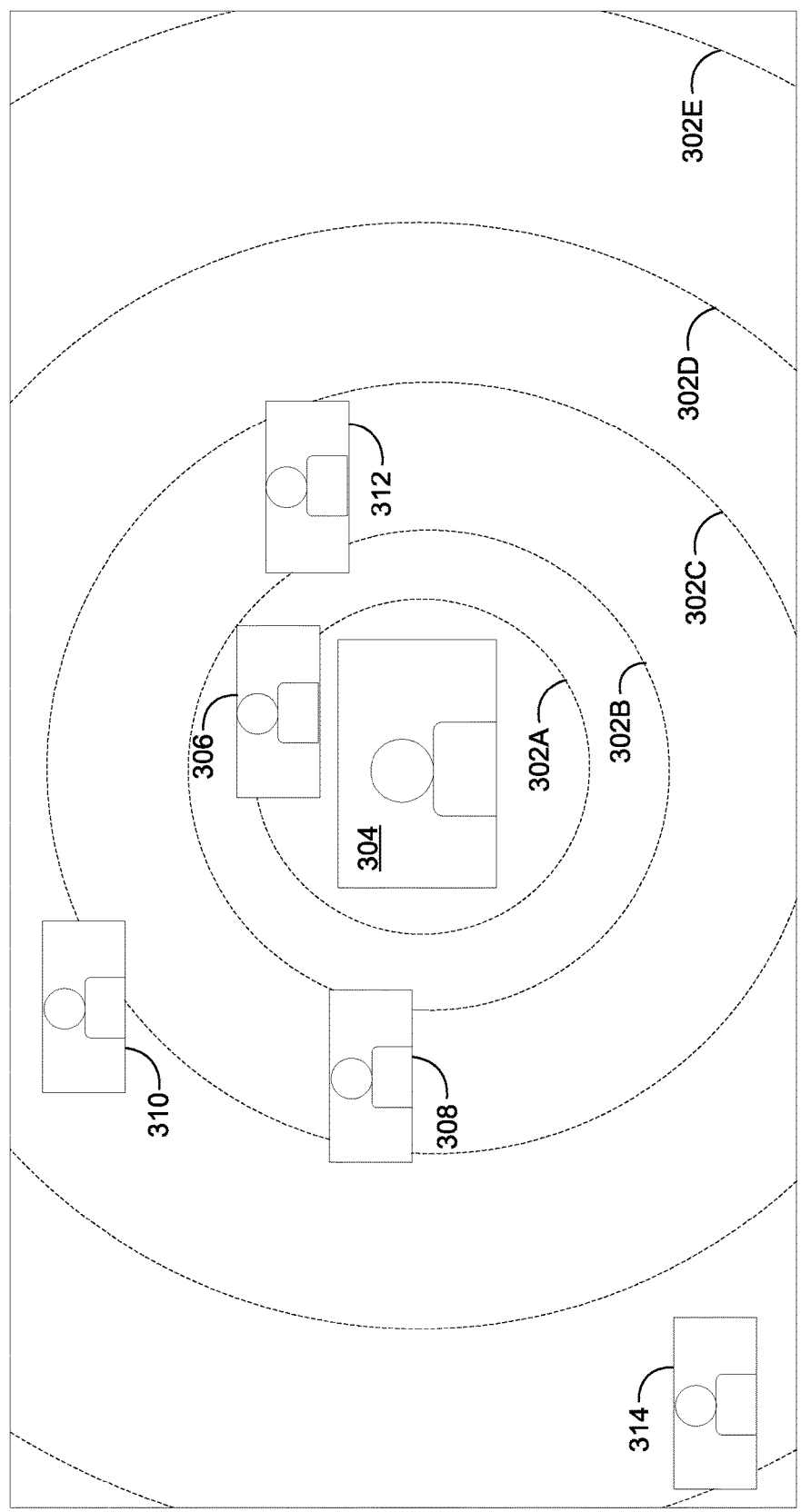
FIG. 3 illustrates an example UI for manipulating user icons, suitable for use in implementing some embodiments of the present disclosure.

With reference to FIG. 3, FIG. 3 illustrates an example UI for manipulating user icons, suitable for use in implementing some embodiments of the present disclosure. FIG. 3 includes application UI 300, user icon 304, and participant icons 306, 308, 310, 312 and 314. In operation, initially, each of the participant icons 306, 308, 310, 312 and 314 may be placed an equal distance around user icon 304. For example, each of the participant icons 306, 308, 310, 312 and 314 may be placed at one of radial distance lines 302A, 302B, 302C, 302D, and 302E. As the users converse, the user associated with user icon 304 may find that one or more users associated with participant icons 306, 308, 310, 312 and 314 is/are speaking very loudly/softly compared to the other users. As such, the user associated with user icon 304 may then select one or more of the participant icons 306, 308, 310, 312 and 314 and move the one or more participant icons further away from user icon 304 or closer to user icon 304. The radial distance lines 302A, 302B, 302C, 302D, and 302E may correspond to volume output levels, with a volume output level being inversely related to a distance to user icon 304 at the center of the application UI 300. For example, participant icon 306, being the closest participant icon to user icon 304, may be associated with the highest volume output compared to the participant icons 308, 310, 312 and 314. As follows, participant icon 314 may be associated with the lowest volume output compared to the participant icons 306, 308, 310, and 312. While FIG. 3 shows radial distance lines 302A, 302B, 302C, 302D, and 302E, this is meant for illustration purposes and is not intended to be limiting. The distance between user icon 304 and each of the participant icons 306, 308, 310, 312 and 314 may be measured using any number of radial distance lines and/or by directly measuring the distance. Moreover, embodiments of application UI 300 are not limited to two dimensions and may be implemented in three dimensions (3D), enabling a user associated with user icon 304 to spherically place the participant icons 306, 308, 310, 312, and 314 in 3D relative to the user icon 304.

Figure 4:
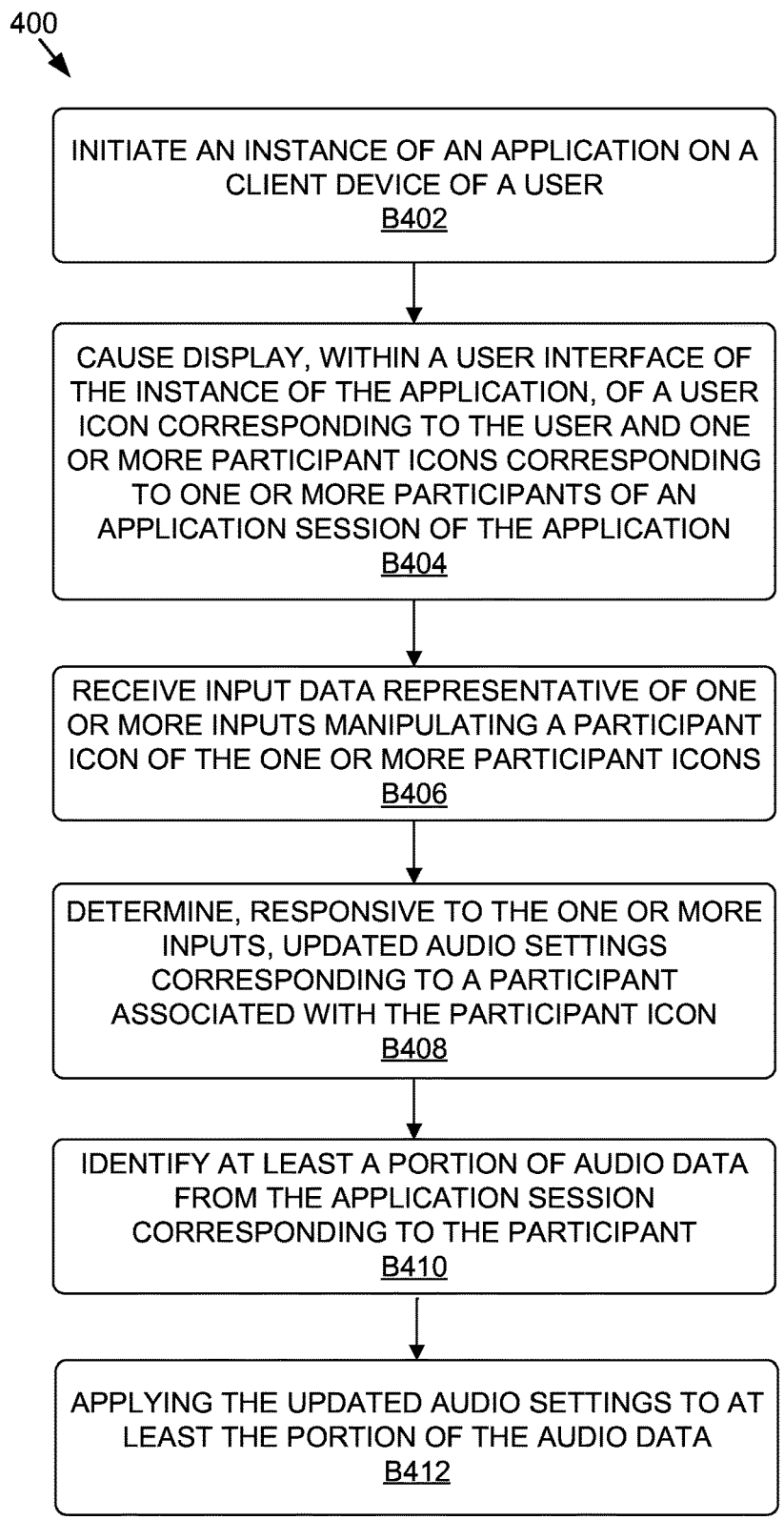
FIG. 4 is a flow diagram showing a method for updating audio settings based on manipulations to an icon, suitable for use in implementing some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method 400 may also be embodied as computer-usable instructions stored on computer storage media. The method 400 may be provided by a standalone application, a service or hosted service (standalone or in combination with another hosted service), or a plug-in to another product, to name a few. In addition, method 400 is described, by way of example, with respect to the system of FIG. 1. However, this method may additionally or alternatively be executed by any one system, or any combination of systems, including, but not limited to, those described herein.

FIG. 4 is a flow diagram showing a method 400 for updating audio settings based on manipulations to an icon, suitable for use in implementing some embodiments of the present disclosure. The method 400, at block B402, includes initiating an instance of an application on a client device of a user. For example, a user may initiate an instance of the application on the user's device by selecting an icon to open the application, selecting a link to join an application session, visiting a web page, and/or other means of initiating an instance of the application.

The method 400, at block B404, includes causing display, within a user interface of the instance of the application, of a user icon corresponding to the user and one or more participant icons corresponding to one or more participants of an application session of the application. For example, when a local user initiates an instance of a video conference application, the user may be provided with a user interface (UI) that displays an icon corresponding to the user as well as several other icons corresponding to participants in the instance of the video conference application.

The method 400, at block B406, includes receiving input data representative of one or more inputs manipulating a participant icon of the one or more participant icons. For example, a local user may select an icon corresponding to a particular participant and move (or cause movement of) the icon away from the local user's icon within a user interface.

The method 400, at block B408, includes determining, responsive to the one or more inputs, updated audio settings corresponding to a participant associated with the participant icon. For example, based on moving (or causing movement of) a remote user's icon away from a local user's icon, the system may determine an updated volume level (e.g., reduce volume) for the remote user's icon.

The method 400, at block B410, identifying at least a portion of audio data from the application session corresponding to the participant. For example, based on moving a remote user's icon away from a local user's icon, the system may identify a subset of audio data (e.g., from within a stream of audio data) corresponding to the remote user.

The method 400, at block B412, includes applying the updated audio settings to at least the portion of the audio data. For example, based on identifying a subset of audio data corresponding to the remote user the system may reduce/increase the output volume of the audio data for the remote user.

Example Content Streaming System

Figure 5:
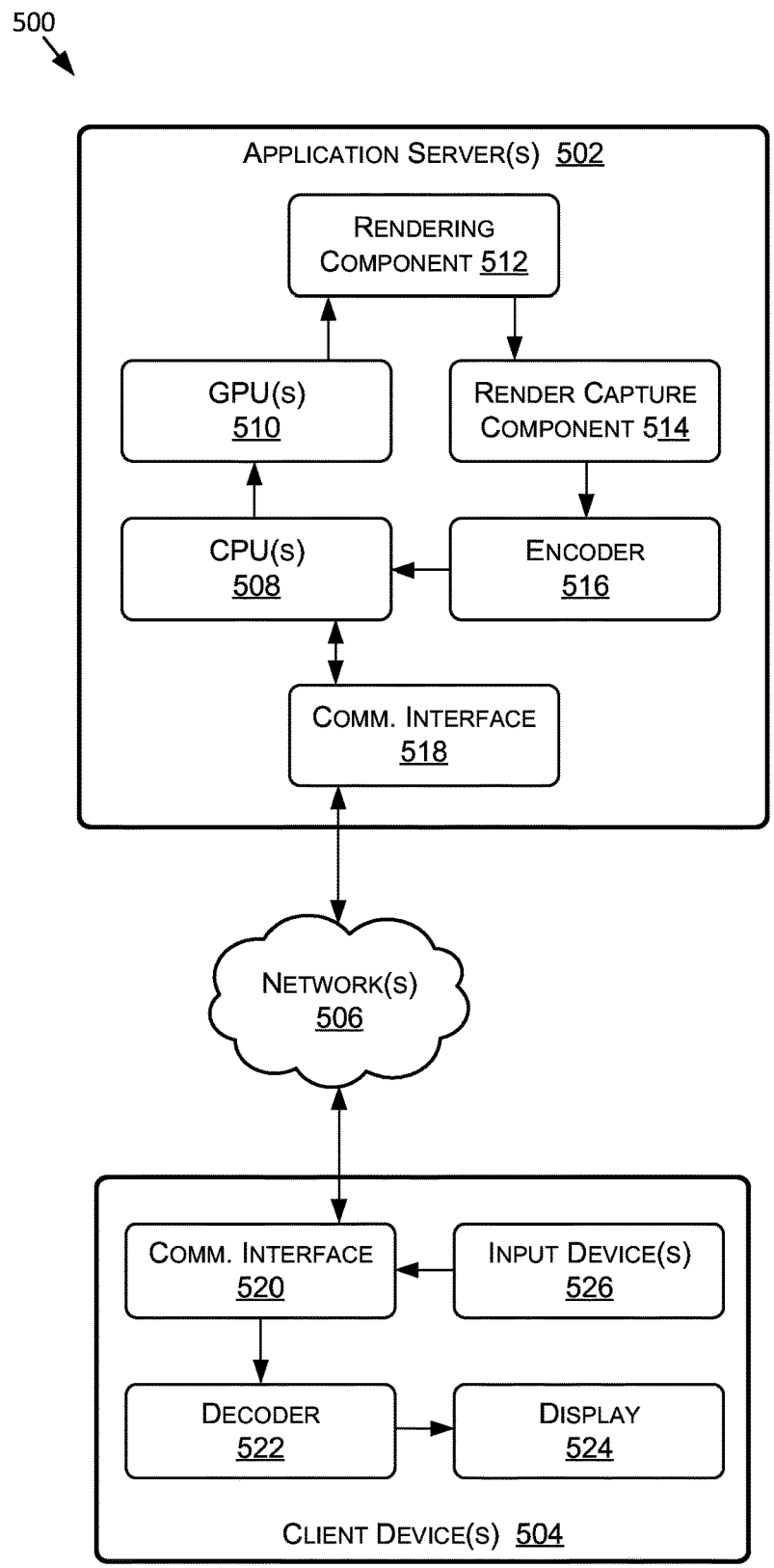
FIG. 5 is a block diagram of an example content streaming system suitable for use in implementing some embodiments of the present disclosure.

Now referring to FIG. 5, FIG. 5 is an example system diagram for a content streaming system 500, in accordance with some embodiments of the present disclosure. FIG. 5 includes application server(s) 502 (which may include similar components, features, and/or functionality to the example computing device 600 of FIG. 6), client device(s) 504 (which may include similar components, features, and/or functionality to the example computing device 600 of FIG. 6), and network(s) 506 (which may be similar to the network(s) described herein). In some embodiments of the present disclosure, the system 500 may be implemented. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 500, for an application session, the client device(s) 504 may only receive input data in response to inputs to the input device(s), transmit the input data to the application server(s) 502, receive encoded display data from the application server(s) 502, and display the display data on the display 524. As such, the more computationally intense computing and processing is offloaded to the application server(s) 502 (e.g., rendering—in particular ray or path tracing—for graphical output of the application session is executed by the GPU(s) of the game server(s) 502). In other words, the application session is streamed to the client device(s) 504 from the application server(s) 502, thereby reducing the requirements of the client device(s) 504 for graphics processing and rendering.

For example, with respect to an instantiation of an application session, a client device 504 may be displaying a frame of the application session on the display 524 based on receiving the display data from the application server(s) 502. The client device 504 may receive an input to one of the input device(s) and generate input data in response. The client device 504 may transmit the input data to the application server(s) 502 via the communication interface 520 and over the network(s) 506 (e.g., the Internet), and the application server(s) 502 may receive the input data via the communication interface 518. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 512 may render the application session (e.g., representative of the result of the input data) and the render capture component 514 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 502. In some embodiments, one or more virtual machines (VMs)—e.g., including one or more virtual components, such as vGPUs, vCPUs, etc.—may be used by the application server(s) 502 to support the application sessions. The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

Example Computing Device

Figure 6:
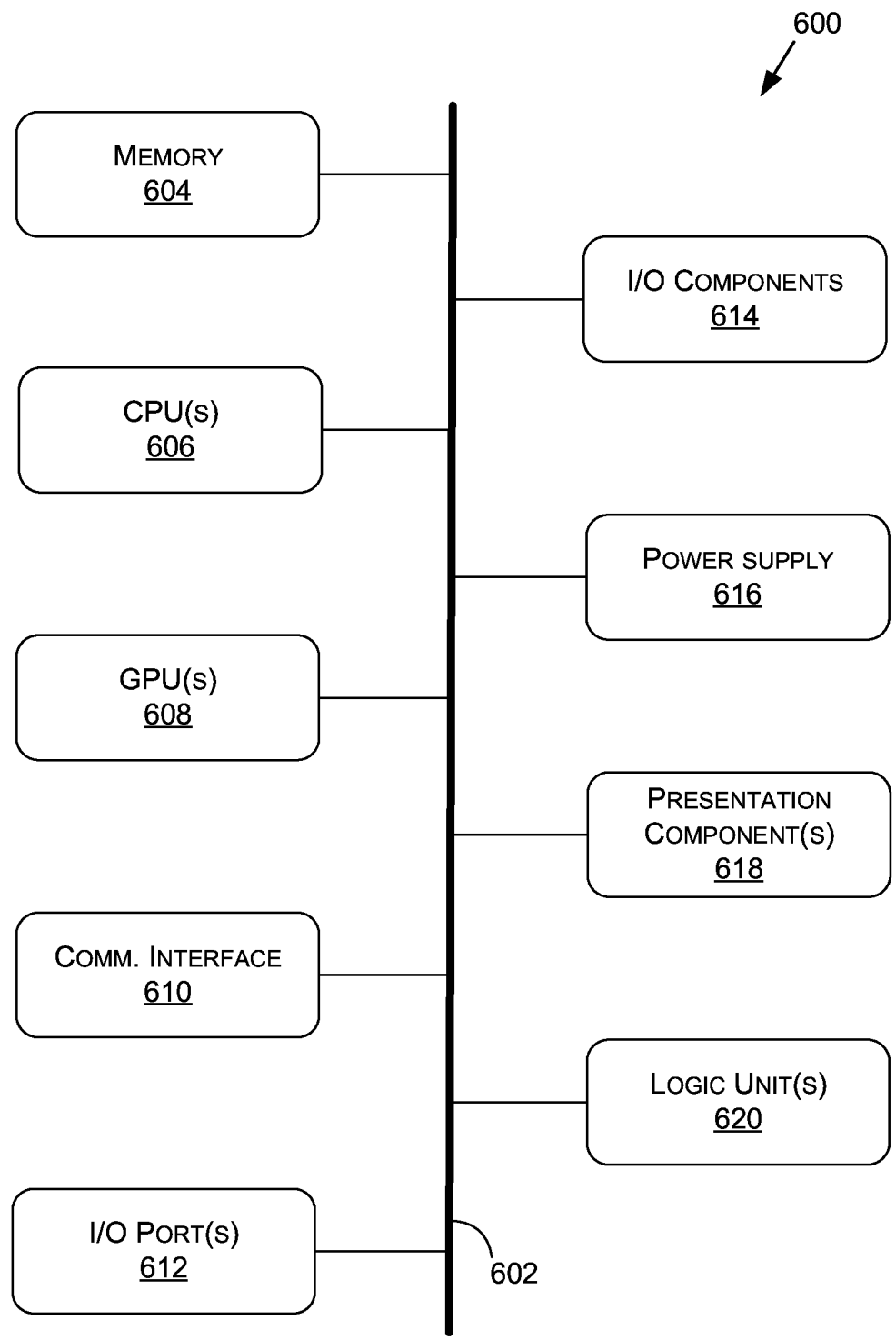
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Data Center

Figure 7:
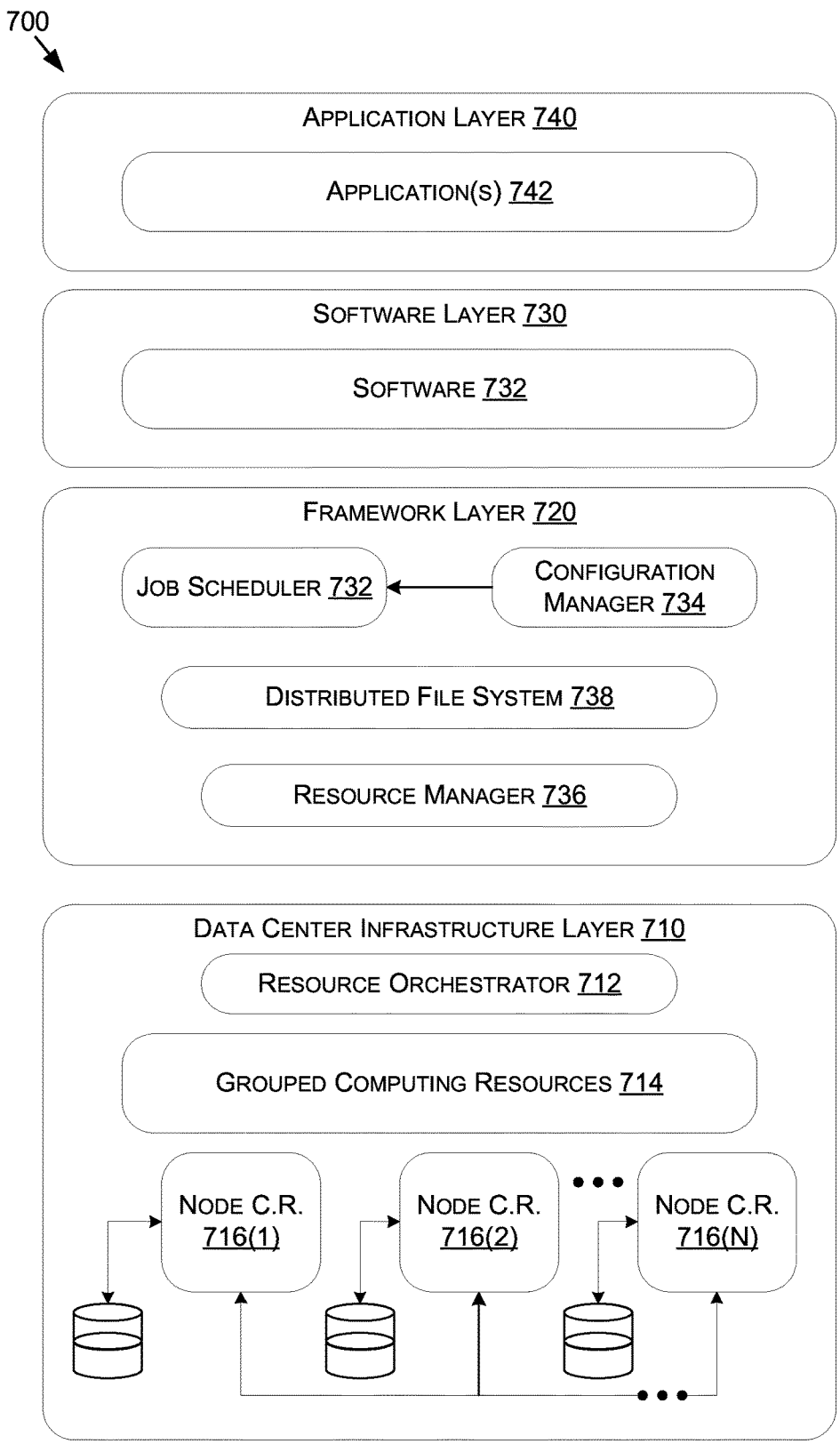
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, and/or other processors may be grouped within one or more racks to provide compute resources to support one or more workloads. The one or more racks may also include any number of power modules, cooling modules, and/or network switches, in any combination.

The resource orchestrator 722 may configure or otherwise control one or more node C.R.s 716(1)-716(N) and/or grouped computing resources 714. In at least one embodiment, resource orchestrator 722 may include a software design infrastructure (SDI) management entity for the data center 700. The resource orchestrator 722 may include hardware, software, or some combination thereof.

In at least one embodiment, as shown in FIG. 7, framework layer 720 may include a job scheduler 732, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. The resource manager 1036 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   within a user interface of an instance of an application executed using a client device of a user, causing display of a user representation of the user and one or more participant representations corresponding to one or more participants of an application session of the application, wherein a size of at least one participant representation of the one or more participant representations is determined based at least in part on one or more historical manipulations to one or more historical participant representations corresponding to at least one participant of the one or more participants during one or more historical application sessions of the application;
   determining, based at least in part on the size of the at least one participant representation, audio settings corresponding to the at least one participant associated with the at least one participant representation; and
   applying the audio settings to at least a portion of audio data from the application session associated with the at least one participant.

2. The method of claim 1, further comprising:
   receiving one or more inputs corresponding to a manipulation of the at least one participant representation corresponding to repositioning the at least one participant representation with respect to a position of the user representation as depicted using the user interface; and
   determining, based at least in part on the one or more inputs, updated audio settings corresponding to the at least one participant.

3. The method of claim 2, wherein:
   the updated audio settings include adjusting a volume level corresponding to the at least one participant when the at least one participant representation is repositioned relative to the position of the user representation as depicted using the user interface.

4. The method of claim 3, wherein the adjusting the volume level comprises at least one of:
   increasing the volume level when the at least one participant representation is repositioned closer to the position of the user representation as depicted using the user interface; or
   decreasing the volume level when the at least one participant representation is repositioned further from the position of the user representation within the user interface.

5. The method of claim 1, further comprising:
   receiving one or more inputs corresponding to a manipulation of the at least one participant representation corresponding to adjusting at least one of a position or the size of the at least one participant representation; and
   determining, based at least in part on the one or more inputs, updated audio settings corresponding to the at least one participant.

6. The method of claim 5, wherein:
   the updated audio settings include adjusting a volume level corresponding to the at least one participant when the at least one of a position or the size of the at least one participant representation is adjusted as depicted using the user interface.

7. The method of claim 6, wherein the adjusting the volume level comprises at least one of:
   increasing the volume level when the size of the at least one participant representation is increased relative to a size of the user representation as depicted using the user interface; or
   decreasing the volume level when the size of the at least one participant representation is decreased relative to the size of the user representation as depicted using the user interface.

8. The method of claim 1, wherein the application corresponds to at least one of a conferencing application, a game streaming application, a content streaming application, or a telephone service application.

9. The method of claim 1, further comprising:
   receiving data representative of an indication that the at least one participant is engaging with the user; and
   adjusting the audio settings to updated audio settings based at least in part on the at least one participant engaging with the user.

10. The method of claim 1, further comprising determining a position of the at least one participant representation relative to a position of the user representation as depicted using the user interface.

11. The method of claim 1, further comprising:
    receiving data representative of at least one of the participants manipulating a representation corresponding to the user within the application session; and
    causing display, within the user interface, of an indication of the manipulating the representation corresponding to the user.

12. A processor comprising:
    one or more circuits to:
       cause display, within a user interface of an application, of a representation of a user corresponding to a user and one or more participant representations corresponding to one or more participants of an application session, wherein a size of at least one participant representation of the one or more participant representations is determined based at least in part on one or more historical manipulations to one or more historical participant representations corresponding to at least one participant during one or more historical application sessions of the application;

generate, based at least in part on the size of the at least one participant representation, updated audio data based at least in part on adjusting a volume level associated with at least a portion of received audio data corresponding to the at least one participant associated with the at least one participant representation; and cause output of the updated audio data.

13. The processor of claim 12, wherein the one or more circuits are further to:

receive one or more inputs corresponding to repositioning the at least one participant representation with respect to the user representation as depicted using the user interface; and generate, based at least in part on the one or more inputs, second updated audio data based at least in part on adjusting a second volume level associated with at least a second portion of the received audio data.

14. The processor of claim 13, wherein the adjusting the second volume level comprises adjusting the second volume level corresponding to the at least one participant when the at least one participant representation is repositioned relative to a position of the user representation as depicted using the user interface.

15. The processor of claim 14, wherein the adjusting the second volume level comprises at least one of:

increasing the second volume level when the participant representation is repositioned closer to the user representation as depicted using the user interface; or decreasing the second volume level when the participant representation is repositioned further from the user representation as depicted using the user interface.

16. The processor of claim 12, wherein the one or more circuits are further to:

receive one or more inputs corresponding to adjusting at least one of a position or the size of the at least one participant representation as depicted using the user interface; and generate, based at least in part on the one or more inputs, second updated audio data based at least in part on adjusting a second volume level associated with at least a second portion of the received audio data.

17. The processor of claim 16, wherein the adjusting the second volume level comprises adjusting the second volume level corresponding to the at least one participant when the at least one of a position or the size of the at least one participant representation is adjusted as depicted using the user interface.

18. The processor of claim 17 wherein the adjusting the second volume level comprises at least one of:

increasing the second volume level when the size of the participant representation is increased as depicted using the user interface; or decreasing the second volume level when the size of the participant representation is decreased as depicted using the user interface.

19. The processor of claim 12, wherein the processor is comprised in at least one of:

a system for performing deep learning operations;
a system implemented using an edge device;
a system incorporating one or more virtual machines (VMs);
a system implemented at least partially in a data center; or
a system implemented at least partially using cloud computing resources.

20. A system comprising:

one or more processing units to:

initiate an instance of an application on a client device of a user;

cause display, within a user interface of the instance of the application, of a user representation of the user and one or more participant representations corresponding to one or more participants of an application session of the application, wherein a size of at least one participant representation of the one or more participant representations is determined based at least in part on one or more historical manipulations to one or more historical participant representations corresponding to at least one participant of the one or more participants during one or more historical application sessions of the application;

determine, based at least in part on the size, audio settings corresponding to the at least one participant associated with the at least one participant representation; and apply the audio settings to at least a portion of audio data from the instance of the application associated with the at least one participant.

21. The system of claim 20, wherein the one or more processing units are further to:

receive one or more inputs manipulating the at least one participant representation to reposition the at least one participant representation with respect to the user representation as depicted using the user interface; and determine, based at least in part on the one or more inputs, updated audio settings corresponding to the at least one participant.

22. The system of claim 21, wherein the updated audio settings include an adjusted volume level corresponding to the at least one participant.

23. The system of claim 22 wherein the adjusted volume level comprises at least one of:

an increased volume level when the at least one participant representation is repositioned closer to the user representation within the user interface; or a decreased volume level when the at least one participant representation is repositioned further from the user representation within the user interface.

24. The system of claim 20, wherein the one or more processing units are further to:

receive one or more inputs manipulating the at least one participant representation to adjust the size of the at least one participant representation; and determine, based at least in part on the one or more inputs, updated audio settings corresponding to the at least one participant.

25. The system of claim 24, wherein the updated audio settings include an adjusted volume level corresponding to the at least one participant.

26. The system of claim 25, wherein the adjusted volume level comprises at least one of:

an increased volume level when the at least one participant representation is increased in size within the user interface; or a decreased volume level when the at least one participant representation is decreased in size within the user interface.

27. The system of claim 20, wherein the system is comprised in at least one of:
- a system for performing deep learning operations;
- a system implemented using an edge device;
- a system incorporating one or more virtual machines (VMs);
- a system implemented at least partially in a data center; or
- a system implemented at least partially using cloud computing resources.

* * * * *